（12）United States Patent
Goel et al.

(10) Patent No.: US 12,210,861 B2
(45) Date of Patent: Jan. 28, 2025

(54) DECENTRALIZED SOFTWARE UPGRADE IMAGE DISTRIBUTION FOR NETWORK DEVICE UPGRADES

(71) Applicant: Juniper Networks, Inc., Sunnyvale, CA (US)

(72) Inventors: Prateek Goel, Bangalore (IN); Rahamath Sharif, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 299 days.

(21) Appl. No.: 17/449,530

(22) Filed: Sep. 30, 2021

(65) Prior Publication Data

US 2023/0094033 A1   Mar. 30, 2023

(51) Int. Cl.
*G06F 8/65* (2018.01)
*H04L 67/00* (2022.01)

(52) U.S. Cl.
CPC .............. *G06F 8/65* (2013.01); *H04L 67/34* (2013.01)

(58) Field of Classification Search
CPC ... G06F 8/65; G06F 8/71; G06F 8/658; H04L 67/10; H04L 67/34; H04L 41/12
See application file for complete search history.

(56) References Cited

U.S. PATENT DOCUMENTS

| | | | |
|---|---|---|---|
| 2008/0288936 A1 | 11/2008 | Ikeda | |
| 2014/0089912 A1* | 3/2014 | Wang | G06F 8/65 717/173 |
| 2018/0295016 A1* | 10/2018 | Frahim | H04L 41/0893 |
| 2020/0117440 A1* | 4/2020 | Lucidarme | G06Q 50/06 |
| 2021/0014117 A1* | 1/2021 | Tsai | H04L 67/141 |

FOREIGN PATENT DOCUMENTS

EP   3502885 A1   6/2019

OTHER PUBLICATIONS

Extended Search Report from counterpart European Application No. 22198882.7 dated Feb. 21, 2023, 9 pp.
Enns, "NETCONF Configuration Protocol," Network Working Group, RFC 4741, Dec. 2006, 96 pp.
(Continued)

*Primary Examiner* — S. Sough
*Assistant Examiner* — Cheneca Smith
(74) *Attorney, Agent, or Firm* — Shumaker & Sieffert, P.A.

(57) ABSTRACT

An example method includes receiving, by a control system for a software upgrade image, respective characterization data for network devices of a network; generating, by the control system and based on the characterization data for the network devices, an image map that indicates, for each portion of a plurality of different portions of the software upgrade image, an image proxy network device selected by the control system from among the network devices to store the portion based on the characterization data; and outputting, by the control system, the image map to a network device of the network devices to cause the network device to obtain each portion of the plurality of different portions of the software upgrade image from the corresponding image proxy network device selected by the control system to store the portion.

20 Claims, 3 Drawing Sheets

(56) References Cited

OTHER PUBLICATIONS

Bjorklund, "YANG—A Data Modeling Language for the Network Configuration Protocol (NETCONF)," Internet Engineering Task Force (IETF), RFC 6020, Oct. 2010, 173 pp.

"Upgrading Device Software Images" Cisco Prime Infrastructure 3.1, Cisco Software Group, Cisco Systems, Inc., 2016, 66 pp. (Applicant points out, in accordance with MPEP 609.04(a), that the year of publication, 2016, is sufficiently earlier than the effective U.S. filing date, so that the particular month of publication is not in issue.).

Response to Extended Search Report dated Feb. 21, 2023, from counterpart European Application No. 22198882.7 filed Oct. 4, 2023, 31 pp.

* cited by examiner

DECENTRALIZED SOFTWARE UPGRADE IMAGE DISTRIBUTION FOR NETWORK DEVICE UPGRADES

TECHNICAL FIELD

The disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

SUMMARY

In general, this disclosure describes techniques for managing network devices. An element management system (EMS), also referred to herein as a control system, is configured to implement decentralized software upgrade image distribution for network device upgrades. For example, a control system is configured to determine, e.g., based on characterization data such as device parameters of managed devices, a manner in which to split a software upgrade image and to identify a subset of the managed devices to serve as image proxy devices for portions of the software upgrade image. In some examples, the device parameters include an amount of storage space available on devices that may be used to store a software upgrade image or portions. The control system generates an image map indicating assignments of different portions of the software upgrade image to be stored by corresponding network devices. In some examples, the control system generates a device upgrade schedule for upgrading the devices based on the image map.

The techniques of this disclosure may provide one or more technical advantages that provide at least one practical application. For example, the techniques of this disclosure enable the control system to download the software upgrade image into the network (e.g., data center) once, then using characterization data such as size, bandwidth, and a topology-aware approach to select managed devices to host the software upgrade image. The control system creates an image map of image hosts and distributes the image map into the managed devices for other managed devices to pull from during image upgrade cycle. This can help in reducing the stress on WAN link to download same image from external sources, and also increases parallel image pulls for faster delivery of images to all devices. Additionally, the techniques of the disclosure may enable creating policies to control the retry and working thresholds of the devices being upgraded to avoid bottlenecks.

In some examples, a method includes receiving, by a control system for a software upgrade image, respective characterization data for network devices of a network; generating, by the control system after receiving the characterization data, an image map that indicates, for each portion of a plurality of different portions of the software upgrade image, an image proxy network device of the network devices selected by the control system to store the portion based on the characterization data; and outputting, by the control system, the image map to a network device of the network devices to cause the network device to obtain each portion of the plurality of different portions of the software upgrade image from the image proxy network device selected by the control system to store the portion.

In some examples, a control system for a software upgrade image manages a set of network devices (also referred to as elements), where the control system includes one or more processors; and a memory comprising instructions that when executed by the one or more processors cause the one or more processors to: receive respective characterization data for network devices of a network; generate, based on the characterization data for the network devices, an image map that indicates, for each portion of a plurality of different portions of the software upgrade image, an image proxy network device selected by the control system from among the network devices to store the portion based on the characterization data; and output the image map to a network device of the network devices to cause the network device to obtain each portion of the plurality of different portions of the software upgrade image from the corresponding image proxy network device selected by the control system to store the portion.

In a further example, a system includes a set of network devices; and a controller device that manages the set of network devices, the controller device comprising: a memory comprising a configuration database including a set of stored network device configurations, wherein each stored network device configuration of the set of stored network device configurations corresponds to a network device of the set of network devices; and processing circuitry configured to: receive respective characterization data for the network devices; generate, based on the characterization data for the network devices, an image map that indicates, for each portion of a plurality of different portions of the software upgrade image, an image proxy network device selected by the control system from among the network devices to store the portion based on the characterization data; and output the image map to a network device of the network devices to cause the network device to obtain each portion of the plurality of different portions of the software upgrade image from the corresponding image proxy network device selected by the control system to store the portion.

In an additional example, a computer-readable storage medium comprising instructions that when executed cause one or more processors of a control system to: receive respective characterization data for network devices of a network; generate, based on the characterization data for the network devices, an image map that indicates, for each portion of a plurality of different portions of the software upgrade image, an image proxy network device selected by the control system from among the network devices to store the portion based on the characterization data; and output the image map to a network device of the network devices to cause the network device to obtain each portion of the plurality of different portions of the software upgrade image from the corresponding image proxy network device selected by the control system to store the portion.

The details of one or more examples are set forth in the accompanying drawings and the description below. Other features, objects, and advantages will be apparent from the description and drawings, and from the claims.

DETAILED DESCRIPTION

Figure 1:
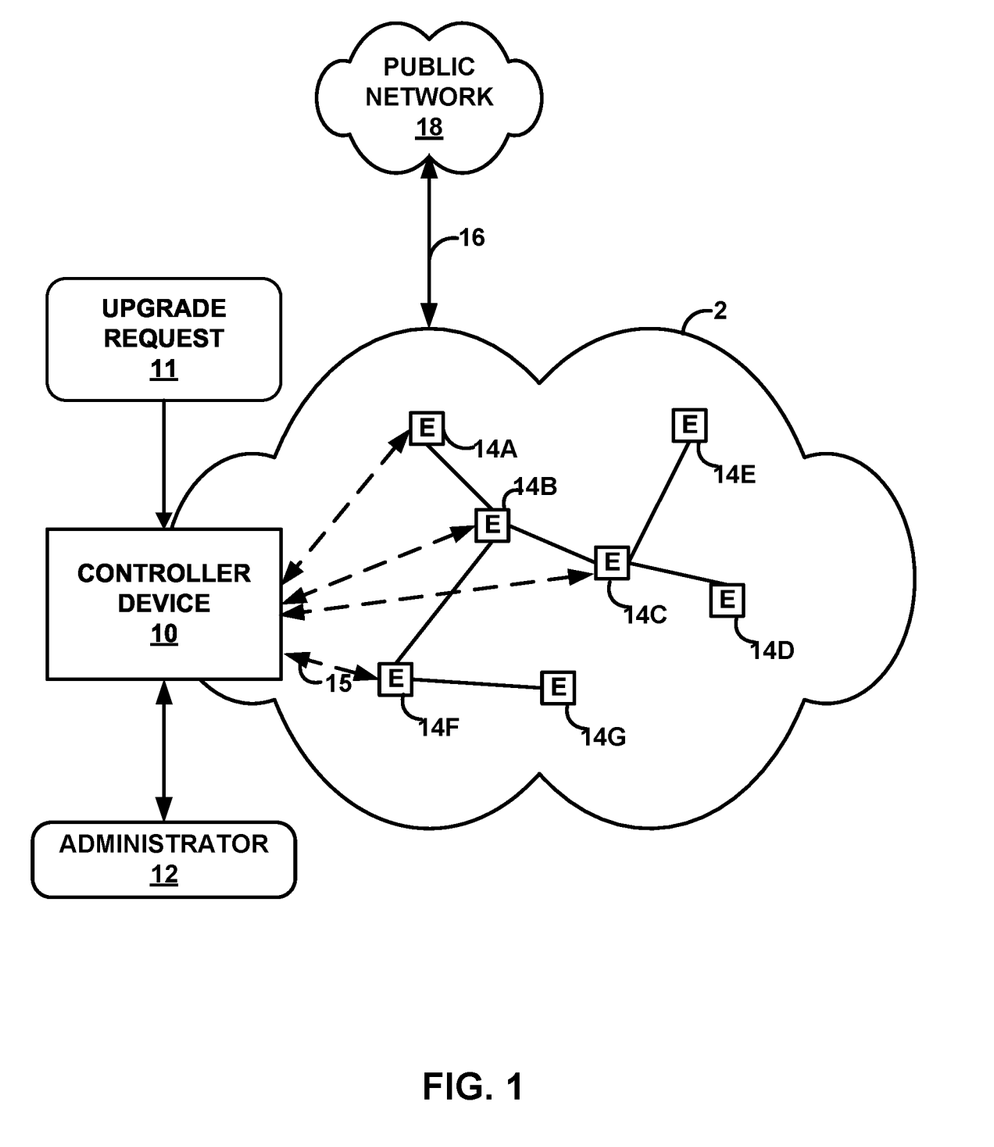
FIG. 1 is a block diagram illustrating an example including elements of an enterprise network that is managed using a controller device, in accordance with one or more techniques of this disclosure.

FIG. 1 is a block diagram illustrating an example including elements of an enterprise network 2 that are managed using a controller device 10, in accordance with one or more techniques of this disclosure. Managed elements 14A-14G (collectively, "elements 14") of enterprise network 2 include network devices interconnected via communication links to form a communication topology to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP).

Communication links interconnecting elements 14 may be physical links (e.g., optical, copper, and the like), wireless, or any combination thereof. Enterprise network 2 may include many more elements 14 than shown in FIG. 1.

Enterprise network 2 is shown coupled to public network 18 (e.g., the Internet) via communication link 16. Public network 18 may include, for example, one or more client computing devices. Public network 18 may provide access to web servers, application servers, public databases, media servers, end-user devices, and other types of network resource devices and content. Although described for purposes of example with respect to an enterprise service network, the techniques of this disclosure are applicable to other types of networks, such as a branch network, a data center network, a service provider network, an Internet Service Provider network, or other type of network.

Controller device 10 is communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrator 12 uses controller device 10 to manage the network devices using a device management protocol. One example device protocol is the Simple Network Management Protocol (SNMP) that allows controller device 10 to traverse and modify management information bases (MIBs) that store configuration data within each of managed elements 14.

In common practice, controller device 10, also referred to as a network management system (NMS) or NMS device, and elements 14 are centrally maintained by an Information Technology (IT) group of the enterprise. Administrator 12 interacts with controller device 10 to remotely monitor and configure elements 14. For example, administrator 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrator 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrator 12 uses controller device 10 to configure elements 14 to specify certain operational characteristics that further the objectives of administrator 12. For example, administrator 12 may specify, for an element 14, a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Controller device 10 may establish NETCONF sessions with one or more of elements 14.

Controller device 10 may be configured to accept high-level configuration data, or intents, from administrator 12 (which may be expressed as structured input parameters, e.g., according to the Yet Another Next Generation (YANG) language, which is described in Bjorklund, "YANG—A Data Modeling Language for the Network Configuration Protocol (NETCONF)," Internet Engineering Task Force, RFC 6020, October 2010, available at tools.ietf.org/html/rfc6020). Controller device 10 may also be configured to output respective sets of low-level device configuration data, e.g., device configuration additions, modifications, and removals.

In some examples, controller device 10 may use YANG modeling for an intent data model and low-level device configuration models. This data may contain relations across YANG entities, such as list items and containers. In some examples, controller device 10 may convert a YANG data model into a database model, and convert YANG validations into data validations.

Controller device 10 may receive data from administrator 12 representing any or all of create, update, and/or delete actions with respect to the intent data model. Controller device 10 may be configured to use the same compilation logic for each of create, update, and delete as applied to the graph model.

To upgrade network devices, such as elements 14, the first step is to pull the image required for upgrade. The techniques of this disclosure are different than an approach in which only a centralized device hosts the software upgrade image, either an on-premises element or Software-as-a-Service (SaaS)-based management solution, where the image to be upgraded is stored in centralized server and accessed via a common link. For data center scenarios in which there are high number of devices with high number of simultaneous pulls, a centralized approach may result in a bottleneck, leading to a larger maintenance time window. Additionally, if the image is being pulled over a WAN network this process can be quite time consuming, depending on speed and number of simultaneous pulls. This disclosure presents an image distribution approach to avoid the simultaneous pulls of the software upgrade image by multiple network devices, such as elements 14, that can result in choked network or server hosting the image.

In some examples in accordance with techniques of this disclosure, controller device 10 may receive, such as from an administrator or other user, upgrade request 11. Upgrade request 11 may include, for example, a command indicating an intent to upgrade the software of elements 14 from a software release "A" to a new or updated software release "B." The software of an element 14 may include an image. An image is a serialized copy of the state of a computer system stored in some non-volatile form such as a file. Upgrade request 11 may indicate a software upgrade image to be used for upgrading elements 14 to the updated software release "B."

In response to receiving upgrade request 11, controller device 10 is configured to determine, e.g., based on device parameters of elements 14, how to split the software upgrade image and to identify a subset of elements 14 to serve as image proxy devices. In some examples, controller device 10 selects half (fifty percent) of elements 14 to serve as image proxy devices. In some examples, the device parameters of elements 14 include an amount of storage space available on elements 14 that may be used to store a software upgrade image. Controller device 10 generates an image map indicating assignments of different portions of the software upgrade image to be stored by corresponding network devices of the selected elements 14. In some examples, controller device 10 generates a device upgrade schedule for upgrading the elements 14 based on the image map.

For example, controller device 10 may determine a network topology of network 2 and may also determine device parameters associated with one or more of elements 14 and generate a topology graph to represent the network topology and device parameters. Controller device 10 may compute an optimization algorithm on the topology graph to produce the image map and device upgrade schedule that attempts to efficiently upgrade the elements 14 to be upgraded using a subset of the elements 14 to be upgraded as image proxy devices.

In some examples, controller device 10 selects one or more of the elements 14 to serve as image proxy devices that store corresponding portions of a software upgrade image, the elements 14 being selected from among a set of network devices to be upgraded. Controller device 10 generates an image map indicating assignments of different portions of the software upgrade image to be stored by corresponding network devices of the selected one or more network devices. Controller device 10 sends the image map to each of elements 14. Controller device 10 sends, based on the image map, the portions of the software upgrade image to the corresponding elements 14 that are assigned as image proxy network devices. In some examples, elements 14 that are assigned as image proxy network devices are configured to, in response to receiving the image map, request their assigned portion of the software upgrade image from the controller device 10, and controller device 10 sends the assigned portion in response to the request. Controller device 10 then instructs the set of network devices to initiate an upgrade process in accordance with the image map.

In general, controllers such as controller device 10 use a hierarchical data model for intents, low-level data models, and resources. The hierarchical data model can be based on YANG or YAML. The hierarchical data model can be represented as a graph, as discussed above. Modern systems have supported intents to ease the management of networks. Intents are declarative. To realize intents, controller device 10 attempts to select optimal resources. Customer environments may be configured to allow customers (e.g., administrators 12) to control intent realization and assure programmed intents. In some examples, controller device 10 may construct a graph data model by querying elements 14 to determine resources provided by elements 14. Controller device 10 may generally be configured with information representing types of resources provided by each of elements 14, but may query elements 14 to determine specific characterization data including resource information for resources matching each of the types of resources provided by elements 14. Types of resources may include, for example, forwarding tables, routing tables, network access policies (e.g., for access by certain users, firewall policies, or the like), memory or other storage availability, or other such resources.

In some examples, controller device 10 may receive a message from an element of elements 14 (e.g., element 14A) indicating characterizing data, such as an amount of storage space available that may be used to store a software upgrade image at element 14A. In some examples, to retrieve the information indicative of the available storage capacity of element 14A (or other characterization data), the controller device 10 may output, to element 14A, a message requesting the available storage capacity of element 14A. In response to the message, controller device 10 may receive, from element 14A, information indicative of the available storage capacity of element 14A. Controller device 10 distributes the software upgrade images to a subset of elements 14 in portions, and an element 14 that needs an upgrade can pull from the subset of elements and do the required upgrades. Controller device 10 does this by receiving respective characterization data for elements of a network; generating, based on the characterization data for the network devices, an image map that indicates, for each portion of a plurality of different portions of the software upgrade image, an image proxy network device selected by the control system from among the network devices to store the portion based on the characterization data. Controller device 10 outputs the image map to each of elements 14 being upgraded to cause the element to obtain each portion of the plurality of different portions of the software upgrade image from the corresponding image proxy network device selected by the control system to store the portion.

Devices such as elements 14 falling into the same local network are considered for image distribution to reduce the load on external communication, reducing hops to fetch image, and reducing latency. To store the image portions, the default storage system of the device is used to avoid additional overhead or change in device infrastructure. Software upgrade images could be a complete device software upgrade image, or an upgrade image for one or more software components of the device. Consider an example of fifty devices in a local network and the image size is of 2 GB. The default source may always be set to the controller device, such as controller device 10, to fallback for any issues in network or during pull from any local set of devices. Since the image is split at controller device 10 as well, this will help to minimize the network usage because the element 14 will pull only the required portion. In some examples, the software upgrade image could be used in its full size if the image size can fit in the free space of the element 14, and then no partitioning of the image is needed. The portions of the image could be uniform or non-uniform, depending on the free space on the devices. This free size is considered after reducing the size of the full image which will be used for actual upgrade. In some examples, the logic can be implemented as part of the existing daemon/services in the system.

For dividing the image and stitching the image portion together, in some examples a simple library function can be written. Additionally, to pull images from central or local devices instead of using SCP/FTP etc., daemons could make calls to central or establish connection to each other for transferring. This may help in reducing overhead of new services spawned in the device.

In addition, for "greenfield" cases where the device may not yet be configured to access the Internet as soon as it is plugged in, the approach described herein that provides for locally distributing the software upgrade image would be useful.

The techniques of this disclosure enable controller device 10 to download the software upgrade image into network 2 (e.g., data center) once, then using characterization data such as size, bandwidth, and a topology-aware approach to select managed devices (elements 14) to host the software upgrade image. Controller device 10 creates an image map of image proxy devices and distributes the image map into the managed devices for other managed devices to pull from during image upgrade cycle. This helps in reducing the stress on WAN link to download same image from external sources, and also increases parallel image pulls for faster delivery of images to all devices. Additionally, the techniques of the disclosure may enable creating policies on controller device 10 to control the retry and working thresholds of the devices being upgraded to avoid bottlenecks.

Figure 2:
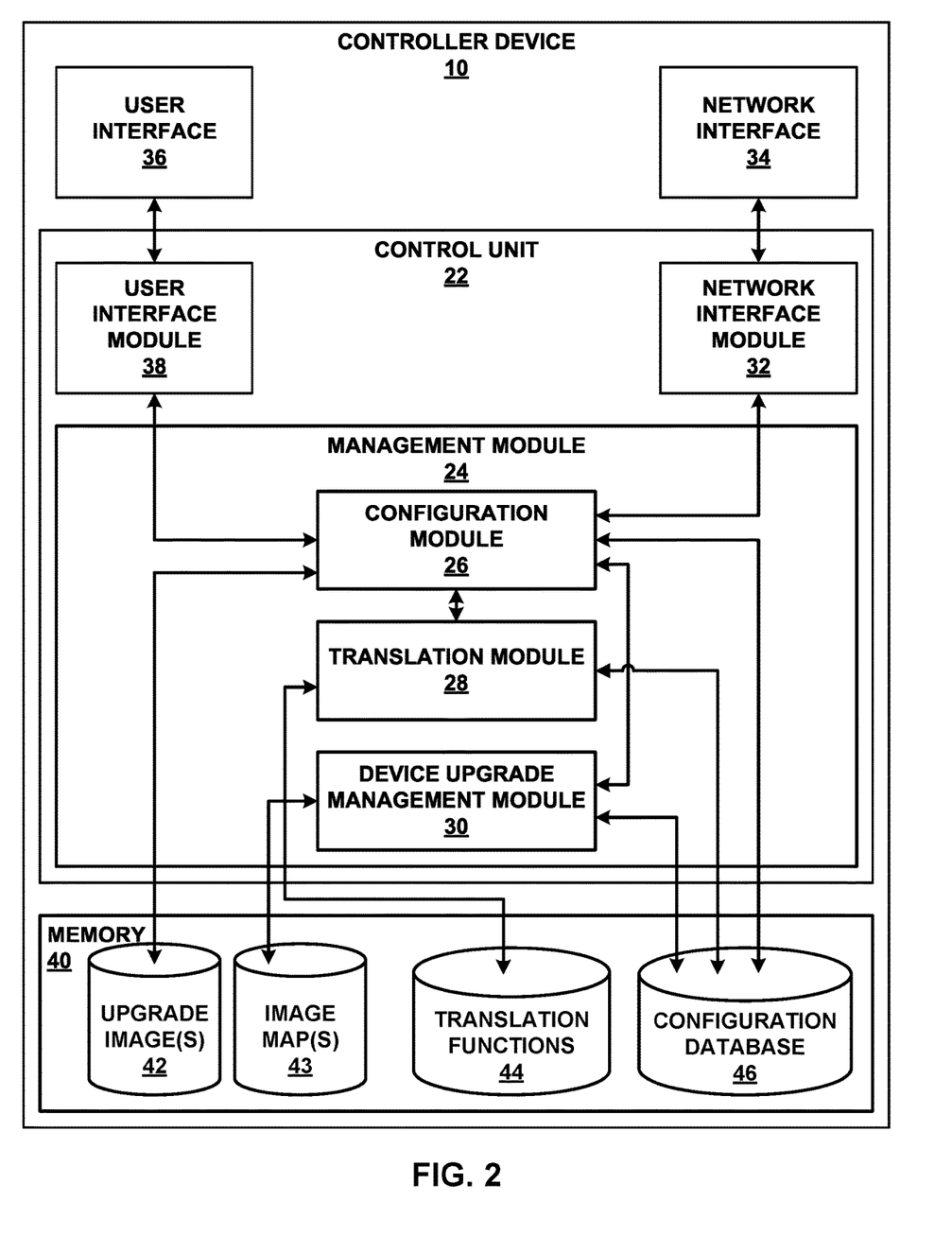
FIG. 2 is a block diagram illustrating an example set of components for the controller device of FIG. 1, in accordance with one or more techniques of this disclosure.

FIG. 2 is a block diagram illustrating an example set of components for controller device 10 of FIG. 1, in accordance with one or more techniques of this disclosure. In this example, controller device 10 includes control unit 22, network interface 34, user interface 36, and memory 40. Control unit 22 includes management module 24, network interface module 32, and user interface module 38. Management module 24 includes configuration module 26, translation module 28, and device upgrade management module 30. Memory 40 includes upgrade image 42, translation functions 44, and configuration database 46.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

Network interface 34 represents an example interface that can communicatively couple controller device 10 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example. User interface 36 represents one or more interfaces by which a user, such as administrator 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, administrator 12 need not directly interact with controller device 10, but instead may access controller device 10 remotely, e.g., via network interface 34.

Memory 40 may be configured to store information within controller device 10 during operation. Memory 40 may include a computer-readable storage medium or computer-readable storage device. In some examples, memory 40 includes one or more of a short-term memory or a long-term memory. Memory 40 may include, for example, random access memories (RAM), dynamic random-access memories (DRAM), static random-access memories (SRAM), magnetic discs, optical discs, flash memories, or forms of electrically programmable memories (EPROM) or electrically erasable and programmable memories (EEPROM). In some examples, memory 40 is used to store program instructions for execution by controller device 10. Memory 40 may be used by software or applications running on controller device 10 to temporarily store information during program execution.

In this example, control unit 22 includes management module 24, network interface module 32, and user interface module 38. Control unit 22 executes user interface module 38 to receive input from and/or provide output to user interface 36. Control unit 22 also executes network interface module 32 to send and receive data (e.g., packets) via network interface 34. Management module 24, network interface module 32, and user interface module 38 may again be implemented as respective hardware units, or in software or firmware, or a combination thereof.

Control unit 22 executes management module 24 to manage various network devices, e.g., elements 14 of FIG. 1. Management includes, for example, configuring the network devices according to instructions received from a user (e.g., administrator 12 of FIG. 1) and providing the user with the ability to submit instructions to configure the network devices. In this example, management module 24 further includes configuration module 26 and translation module 28.

Management module 24 is configured to receive intents (e.g., high-level configuration instructions) for a set of managed network devices from a user, such as administrator 12. Over time, the user may update the configuration instructions, e.g., to add new services, remove existing services, or modify existing services performed by the managed devices. The intents may be structured according to, e.g., YANG.

Memory 40 includes configuration database 46. Configuration database 46 generally includes information describing managed network devices, e.g., elements 14. For example, configuration database 46 may include information indicating device identifiers (such as media access control (MAC) and/or internet protocol (IP) addresses), device type, device vendor, devices species (e.g., router, switch, bridge, hub, etc.), or the like. Configuration database 46 also stores device-level configuration information based on intents (e.g., high-level configuration information, or in some cases, both high-level configuration and low-level configuration information) for the managed devices (e.g., elements 14). Configuration database 46 may store configuration information corresponding to each element of elements 14 such that management module 24 may access configuration for any one or more of elements 14. For example, management module 24 may access configuration information corresponding to a configuration that controller device 10 pushed to element 14C. In addition, configuration database 46 may store information periodically collected from elements 14, including storage capacity.

Translation module 28 determines which devices are managed using configuration database 46. Translation module 28 determines which of translation functions 44 to execute on the high-level configuration instructions based on the information of configuration database 46, e.g., which of the devices are to receive the low-level configuration instructions. Translation module 28 then executes each of the determined translation functions of translation functions 44, providing the high-level configuration instructions to the translation functions as input and receiving low-level configuration instructions. Translation module 28 may then provide the low-level configuration instructions to configuration module 26. In some examples, translation module 28 may receive one intent corresponding to a high-level configuration and translate the high-level configuration to a set of low-level configurations, each low-level configuration corresponding to a respective element of elements 14. In some examples, translation module 28 may receive an intent corresponding to one of elements 14, and translate the intent to a low-level configuration corresponding to the respective element.

After receiving the low-level configuration instructions from translation module 28, configuration module 26 sends the low-level configuration instructions to respective managed network devices (e.g., elements 14) for which configuration is to be updated via network interface module 32. Network interface module 32 passes the low-level configuration instructions to network interface 34. Network interface 34 forwards the low-level configuration instructions to the respective network devices.

In response to receiving the upgrade request 11, configuration module 26 stores data from the request to configuration database 46. Device upgrade management module 30 downloads the upgrade image from the WAN link, and stores it to upgrade image 42. Device upgrade management module 30 generates image maps 43 based on characterization data received from network elements 14, such as one or more of device data and topology data. Device data may include information about available storage on the device for storing upgrade images or portions thereof. Device upgrade management module 30 partitions an image into portions that include serialized data broken into ordered sections.

Configuration database 46 may also include upgrade completion state information. As device upgrade management module 30 receives messages from the elements 14 being upgraded that they have received all of the portions of the software upgrade image, stitched the image portions together, and completed their upgrades, device upgrade management module 30 updates the upgrade completion state information.

When multiple network devices are selected to serve as image proxy devices, device upgrade management module 30 may, in some examples, generate the image map by assigning each portion of the software upgrade image to multiple network devices of the plurality of network devices. In this example, the image map contains a list of the multiple network devices in an order in which the set of network devices to be upgraded should attempt to download the portion of the software upgrade image if a previous attempt fails.

Although user interface 36 is described for purposes of example as allowing administrator 12 (FIG. 1) to interact with controller device 10, other interfaces may be used in other examples. For example, controller device 10 may include a representational state transfer (REST) client (not shown) that may act as an interface to another device, by which administrator 12 may configure controller device 10. Likewise, administrator 12 may configure elements 14 by interacting with controller device 10 through the REST client.

Controller device 10 further stores data representing resources provided by elements 14 (FIG. 1) in configuration database 46. The resources may include, for example, network services, hardware and/or software units, and tables of elements 14. Thus, the resources may include, for example, network tunnels (such as label switched paths (LSPs)), virtual private networks (VPNs), virtual routing and forwarding (VRF) tables, hardware interfaces, logical interfaces, storage space, or the like. Controller device 10 may be configured with a playbook, which administrator 12 (FIG. 1) can use to program the various resources. The playbook may contain a set of resource definitions, resource discovery rules, and a resource merge strategy.

In some examples, management module 24 is configured to receive a high-level intent file corresponding to an intended configuration for one or more elements of elements 14. The high-level intent file may represent a high-level configuration. As used herein, the term "high-level configuration" refers to a configuration which can be programmed and/or altered by a user. A "low-level configuration" may refer to a configuration that a network device such as one of elements 14 is configured to process and implement. Translation module may translate, using the translation functions 44, the high-level configuration to one or more low-level configurations, wherein each low-level configuration of the one or more low-level configurations corresponds to an element of elements 14. Translation module 28 may send the one or more low-level configurations to configuration module 26.

Device upgrade management module 30 selects one or more network devices to serve as image proxy devices that store one or more corresponding portions of a software upgrade image, the one or more devices being selected from among a set of network devices to be upgraded. For example, device upgrade management module 30 selects a device to store the image portion that can accommodate the image portion size; these devices are called image proxy network devices. Device upgrade management module 30 then initializes the image in the network. Device upgrade management module 30 triggers the image upgrade sequence to the devices. Each of the devices pull the portions of the image from image proxy devices according to image map 43 and stitch the portions together to create a complete image. Once all the devices have the complete image and have signaled controller device 10 to indicate that they have the complete image, device upgrade management module 30 triggers the upgrade command on the devices.

As an example, the following are the steps taken to distribute the image in the above example: Select the device to store the image portion. An example method to achieve this:
  1) Select devices to be upgraded on a management system (n).
  2) select n/2 devices which have maximum space and have reachability to all other devices selected for upgrade.
  3) Portion calculation (could be partial or full image):
  4) The minimal size available out of the selected devices in step 2 will be used as the portion size of the image. Number of portions is calculated using this as ImageSize/PortionSize.
  5) If the free space size is same as the image size, then there is no need to split the image into portions, but rather use the full image as a single unit.
  6) This device selection can be made using topology awareness. For example, devices sitting closer to a gateway or that are the gateways themselves could be preferred as image proxy devices to avoid clogging the devices underneath for initial image distribution.
  7) An empty map/table is created consisting of a default pull option which points to pull from the controller device.
  8) A separate initialization table is created holding the list of image proxy devices and the image portion each will hold.

For example, out of 50 devices select 25 devices to become image proxy devices.

Example 1

Assume the minimum free size is same as the image size then the controller device will maintain the list of the image proxy devices holding the image. Table 1 is an example initialization table of an image map for example 1.

TABLE 1

| Portion Details | Devices |
| --- | --- |
| Portion1 - (start and end index of end in image) | D1, D5, D9, D13, D17, D21 |

Example 2

Assume the minimum free size available on a device is 500M.

Number of portions of the image=2 G/500 M=4 [Dividing 25 into 4 portions is not even, so use 24 devices]. Table 2 is an example initialization table of an image map for example 2.

TABLE 2

| Portion Details | Devices |
| --- | --- |
| Portion1 - (start and end index of part in image) | D1, D5, D9, D13, D17, D21 |
| Portion2 - (start and end index of part in image) | D2, D6, D10, D14, D18, D22 |
| Portion3 - (start and end index of part in image) | D3, D7, D11, D15, D19, D23 |
| Portion4 - (start and end index of part in image) | D4, D8, D12, D16, D20, D24 |

In this manner, generating the image map can include assigning each portion of the software upgrade image to multiple network devices of the plurality of network devices, the image map containing a list of the multiple network devices in an order in which the set of network devices to be upgraded should attempt to download the portion of the software upgrade image if a previous attempt fails.

To initialize the image in the network, the following example approach may be used.

1) Based on the default table discussed above, the devices are signaled to pull that specific part of the image in the following format.
2) Select initial device(s) to send the image:
   a) For the case where the image is not split, first the initial device is signaled to pull the image.
   b) For the case where the image is split, first the initial devices D1, D2, D3 and D4 are signaled to pull the image.
3) Once these devices confirm the successful pull, the remaining image proxy devices are triggered in parallel.
   a) For no slicing of the image (Example 1 above), then all other devices simply receive the list of devices to from which to pull the image.
   b) These devices get the following response from the controller device and based on this response the rest of the devices per Table 2 will do parallel pulls from the devices mentioned.
   c) Controller device 10 will respond with the image map of portions of images and the devices which host them.

Example

For point 3b above: Devices D5 to D24 will do parallel pulls from the devices D1 to D4, as shown in Table 3.

TABLE 3

| Portion Details | Devices |
| --- | --- |
| Portion1 - (start and end index of part in image) | D1 |
| Portion2 - (start and end index of part in image) | D2 |
| Portion3 - (start and end index of part in image) | D3 |
| Portion4 - (start and end index of part in image) | D4 |

Device upgrade management module 30 spreads the complete image to all devices, such as by the following process: Once all the image proxy devices have the image portions, all the devices selected for upgrade are signaled to pull the image portions. The pull command triggered on devices will contact the central server (e.g., controller device 10). Controller device 10 will respond with the image map of portions of images and the devices which host them. For example, one of Table 2 will be shared with all the devices. The triggered device will then pull the portions of the images (the number of portions could be 1 if the triggered device is dealing with a full image) from the devices in the map. If an image pull fails (e.g., either a pull of an image portion or a pull of a full image), the triggered device attempts to pull the image portion or the full image from the next device in the list. Example control policies that can be configured on elements 14: If the pull from a device fails, a policy could be defined to retry N number of times. If, all retries fail, then the device attempting to pull the image or image portion may fall back to the central server that stores the software upgrade image (which may be distinct from or the same as controller device 10). In some examples, the number of parallel pulls can be controlled by a threshold of the device. For example, if a new incoming pull request raises the threshold of the system by 50% in terms of CPU and Memory usage, the request will be denied. The following process outlines the flow a typical device will go through to pull the image or image portions: 1. Request the image from controller device 10 or a central server. Receive the image map from controller device 10. For the image portions not yet pulled, do the following: for all the image proxy devices on the list, pull the image portion from the image proxy device listed first on the image map. If the image portion pull is not successful, go to the next image proxy host on the list for that same specific image portion. Proceed until the image portion is successfully pulled. However, if no more image proxy devices remain on the list, and no more retries are available, pull from the central server as a fallback. Trigger the image upgrade sequence to the devices. Once all the devices have the images and signaled the central that they have the complete image, the upgrade command is triggered on devices.

Figure 3:
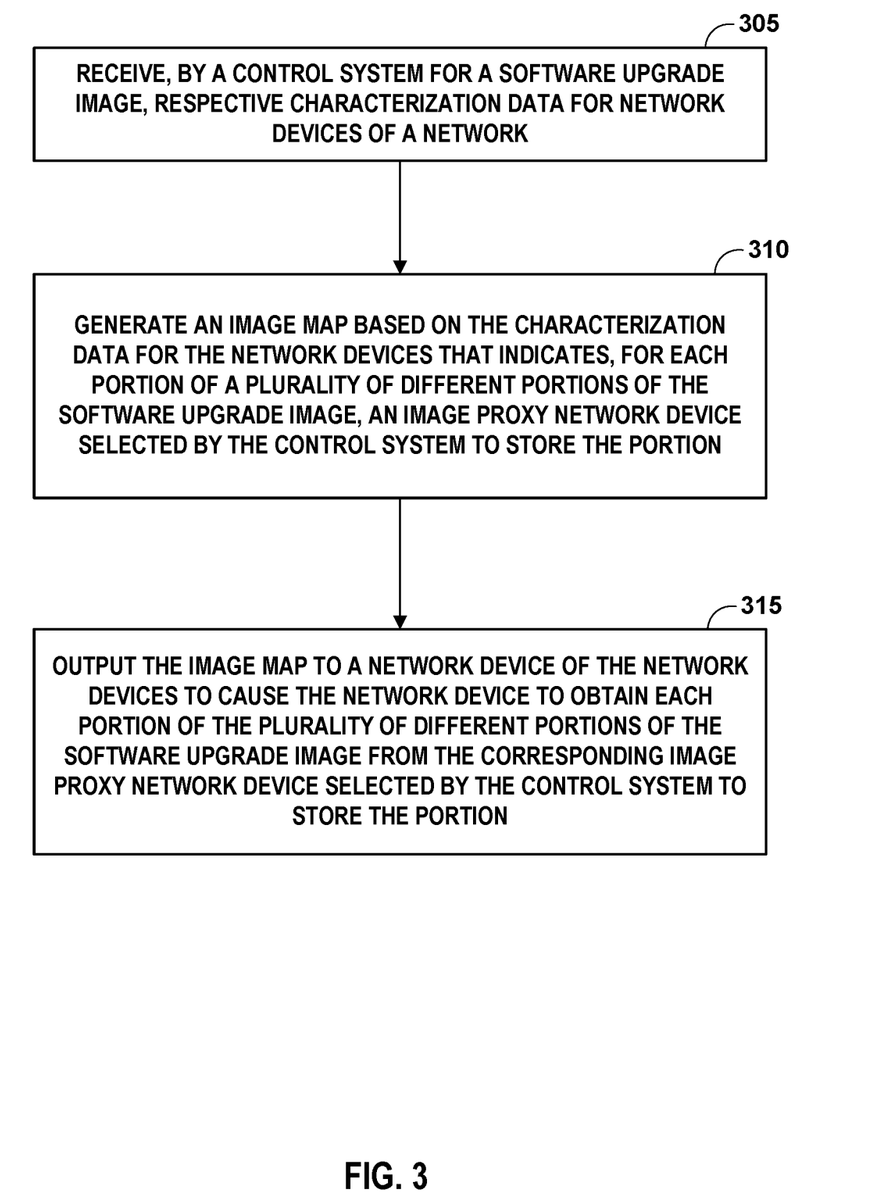
FIG. 3 is a flow diagram illustrating an example operation for decentralized software upgrade image distribution for network device upgrades, in accordance with one or more techniques of this disclosure.

FIG. 3 is a flow diagram illustrating an example operation of a control system for decentralized software upgrade image distribution for network device upgrades, in accordance with one or more techniques of this disclosure. For convenience, FIG. 3 is described with respect to controller device 10 and elements 14 of FIGS. 1-2. However, the techniques of FIG. 3 may be performed by different components of controller device 10 and elements 14 or by additional or alternative devices.

In the example of FIG. 3, controller device 10 receives respective characterization data for network devices of a network (305). The network may be, for example, an enterprise network, a branch network, a data center network, a service provider network, an Internet Service Provider network, or other network. The characterization data for the network devices (elements) may include, for example, one or more of information relating to a topology of the network, a distance of the network devices to a location where a full image or image portion is stored, and an amount of available data storage space on the network devices. In some examples, controller device 10 considers a distance from a given network device to other network devices in selecting image proxy network devices. Controller device 10 may generate, based on the characterization data for the network devices, an image map that indicates, for each portion of a plurality of different portions of the software upgrade image, an image proxy network device selected by the control system from among the network devices to store the portion based on the characterization data (310). Controller device 10 outputs the image map to an element of elements 14 to cause the element to obtain each portion of the plurality of different portions of the software upgrade image from the corresponding image proxy network device selected by controller device 10 to store the portion (315).

In some examples, controller device 10 instructs a network device of the set of the network devices to be upgraded to initiate an upgrade process that obtains portions of the upgrade image in accordance with the image map. In some examples, the software upgrade image is for upgrading a software component to be executed by the network device. In some examples, generating the image map includes assigning each portion of the software upgrade image to multiple network devices of the plurality of network devices, the image map containing a list of the multiple network devices in an order in which the set of network devices to be upgraded should attempt to download the portion of the software upgrade image if a previous attempt fails. In some examples, generating the image map comprises selecting a predefined proportion of the network devices to serve as image proxy network devices (e.g., 50% (half), 25%, 75%, one third, or another predefined portion), controller device 10 stores an indication of the predefined proportion in configuration database 46, received via configuration module 26. In some examples, prior to generating the image map, controller device 10 identifies the network devices to be upgraded from among a plurality of network devices managed by the controller device 10. For example, out of a set of elements 14, controller device 10 identifies a subset as network devices to be upgraded prior to generating the image map.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method comprising:
receiving, by a control system for a software upgrade image, respective characterization data for network devices of a network;
generating, by the control system and based on the characterization data for the network devices, an image map that indicates, for each portion of a plurality of different portions of the software upgrade image, one or more image proxy network devices assigned by the control system from among the network devices to store the portion based on the characterization data, wherein the image map indicates an order of the one or more image proxy network devices from which a network device to be upgraded should attempt to download the portion of the software upgrade image if a previous attempt fails; and
outputting, by the control system, the image map to the network device of the network devices to cause the network device to obtain each portion of the plurality of different portions of the software upgrade image from a corresponding image proxy network device of the one or more image proxy network devices assigned by the control system to store the portion.

2. The method of claim 1, further comprising: instructing, by the control system, the network device of the network devices to be upgraded to initiate an upgrade process that obtains portions of the software upgrade image in accordance with the image map.

3. The method of claim 1, wherein the software upgrade image is for upgrading a software component to be executed by the network device.

4. The method of claim 1, wherein generating the image map comprises generating the image map based on at least one of the characterization data upon which the generating the image map is based comprises one or more selected from the group consisting of: a topology of the network, a distance of the network devices to a location where the software upgrade image is stored, and an amount of available data storage space on the network devices.

5. The method of claim 1, wherein generating the image map comprises selecting a predefined proportion of the network devices to serve as the one or more image proxy network devices, wherein the control system stores an indication of the predefined proportion received via configuration information.

6. The method of claim 5, wherein selecting the predefined proportion of the network devices comprises selecting half of the network devices to serve as the one or more image proxy network devices.

7. The method of claim 1, further comprising identifying, by the control system and prior to generating the image map, the network devices as network devices to be upgraded from among a plurality of network devices managed by the control system.

8. The method of claim 1, further comprising:
configuring, by the control system, the network device to be upgraded to request the portion of the software upgrade image from the control system or a central server if attempts by the network device to download the portion of the software upgrade image from the one or more image proxy network devices fail.

9. A control system for a software upgrade image, the control system comprising:
one or more processors; and
memory comprising instructions that, when executed by the one or more processors, cause the one or more processors to:
receive respective characterization data for network devices of a network;
generate, based on the characterization data for the network devices, an image map that indicates, for each portion of a plurality of different portions of the software upgrade image, one or more image proxy network devices assigned by the control system from among the network devices to store the portion based on the characterization data, wherein the image map indicates an order of the one or more image proxy network devices from which a network device to be upgraded should attempt to download the portion of the software upgrade image if a previous attempt fails; and
output the image map to the network device of the network devices to cause the network device to obtain each portion of the plurality of different portions of the software upgrade image from a corresponding image proxy network device of the one or more image proxy network devices assigned by the control system to store the portion.

10. The control system of claim 9, wherein the memory further comprises instructions that when, executed by the one or more processors, cause the one or more processors to: instruct the network device of the network devices to be upgraded to initiate an upgrade process that obtains portions of the software upgrade image in accordance with the image map.

11. The control system of claim 9, wherein the software upgrade image is for upgrading a software component to be executed by the network device.

12. The control system of claim 9, wherein the characterization data upon which the generation of the image map is based comprises one or more selected from the group consisting of: a topology of the network, a distance of the network devices to a location where the software upgrade image is stored, and an amount of available data storage space on the network devices.

13. The control system of claim 9, wherein to generate the image map comprises to select a predefined proportion of the network devices to serve as the one or more image proxy network devices, wherein the control system stores an indication of the predefined proportion received via configuration information.

14. The control system of claim 13, wherein to select the predefined proportion of the network devices comprises to select half of the network devices to serve as the one or more image proxy network devices.

15. The control system of claim 9, wherein the memory further comprises instructions that when executed by the one or more processors cause the one or more processors to: identify, by the control system and prior to generating the image map, the network devices as network devices to be upgraded from among a plurality of network devices managed by the control system.

16. The control system of claim 9, wherein the memory further comprises instructions that, when executed by the one or more processors, cause the one or more processors to:
configure the network device to be upgraded to request the portion of the software upgrade image from the control system or a central server if attempts by the network device to download the portion of the software upgrade image from the one or more image proxy network devices fail.

17. Computer-readable storage media comprising instructions that when executed cause one or more processors of a control system to:
receive respective characterization data for network devices of a network;
generate, based on the characterization data for the network devices, an image map that indicates, for each portion of a plurality of different portions of a software upgrade image, one or more image proxy network devices assigned by the control system from among the network devices to store the portion based on the characterization data, wherein the image map indicates an order of the one or more image proxy network devices from which a network device to be upgraded should attempt to download the portion of the software upgrade image if a previous attempt fails; and
output the image map to the network device of the network devices to cause the network device to obtain each portion of the plurality of different portions of the software upgrade image from a corresponding image proxy network device of the one or more image proxy network devices assigned by the control system to store the portion.

18. The computer-readable storage media of claim 17, further comprising instructions that when executed cause the one or more processors of the control system to:
instruct the network device of the network devices to be upgraded to initiate an upgrade process that obtains portions of the software upgrade image in accordance with the image map.

19. The computer-readable storage media of claim 17, wherein the characterization data upon which the generation of the image map is based comprises one or more selected from the group consisting of: a topology of the network, a distance of the network devices to a location where the software upgrade image is stored, and an amount of available data storage space on the network devices.

20. The computer-readable storage media of claim 17, wherein the instructions when executed further cause the one or more processors to:
configure the network device to be upgraded to request the portion of the software upgrade image from the control system or a central server if attempts by the network device to download the portion of the software upgrade image from the one or more image proxy network devices fail.

* * * * *